(12) United States Patent
Hausladen et al.

(10) Patent No.: US 12,365,231 B2
(45) Date of Patent: Jul. 22, 2025

(54) CONSTRUCTION- AND/OR MATERIAL-HANDLING MACHINE

(71) Applicant: Liebherr-Components Biberach GmbH, Biberach an der Riss (DE)

(72) Inventors: Norbert Hausladen, Biberach an der Riss (DE); Viktor Schindler, Uttenweiler (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 0 days.

(21) Appl. No.: 18/739,026

(22) Filed: Jun. 10, 2024

(65) Prior Publication Data

US 2024/0326575 A1    Oct. 3, 2024

Related U.S. Application Data

(63) Continuation of application No. PCT/EP2022/083407, filed on Nov. 28, 2022.

(30) Foreign Application Priority Data

Dec. 10, 2021   (DE) .......................... 102021132651.6
Feb. 15, 2022   (DE) .......................... 102022103465.8

(51) Int. Cl.
*B60K 6/365*   (2007.10)
*B60K 6/485*   (2007.10)
(Continued)

(52) U.S. Cl.
CPC .............. *B60K 6/365* (2013.01); *B60K 6/485* (2013.01); *B60W 10/08* (2013.01); *B60W 20/10* (2013.01);
(Continued)

(58) Field of Classification Search
CPC .......... B60K 6/365; B60K 6/485; B60K 6/24; B60K 6/26; B60K 6/369;
(Continued)

(56) References Cited

U.S. PATENT DOCUMENTS

| 2002/0094898 A1* | 7/2002 | Hata | B60K 6/365 |
| | | | 903/910 |
| 2003/0094317 A1* | 5/2003 | Takizawa | B60W 20/00 |
| | | | 903/910 |

(Continued)

FOREIGN PATENT DOCUMENTS

| CN | 111231648 | 6/2020 |
| CN | 111688469 | 9/2020 |

(Continued)

OTHER PUBLICATIONS

English translation of DE102018118659A1; http://translationportal.epo.org; Dec. 17, 2024 (Year: 2024).*

(Continued)

*Primary Examiner* — Roger L Pang
(74) *Attorney, Agent, or Firm* — Levine Bagade Han LLP

(57) ABSTRACT

The invention relates to a construction- and/or material-handling machine such as a crane, excavator or tracked vehicle, comprising an internal combustion engine that drives one or more energy-consuming devices such as a pump, winch, actuator for a structure or working-unit drives of the construction- and/or material-handling machine via a mechanical drive train. According to the invention, an electric drive for driving the mechanical drive train is provided and can be engaged by means of a clutch and decoupled from the mechanical drive train.

18 Claims, 6 Drawing Sheets

(51) Int. Cl.
*B60W 10/08* (2006.01)
*B60W 20/10* (2016.01)
*B60W 10/30* (2006.01)
*F16H 1/28* (2006.01)

(52) U.S. Cl.
CPC ........ *B60W 10/30* (2013.01); *B60Y 2200/416* (2013.01); *F16H 2001/2881* (2013.01)

(58) Field of Classification Search
CPC .......... F16H 2001/2881; B60W 10/30; B60W 10/08; B60W 20/40; B60W 20/10
USPC .......................... 475/5, 339; 477/3; 29/401.1
See application file for complete search history.

(56) References Cited

U.S. PATENT DOCUMENTS

| | | | | |
|---|---|---|---|---|
| 2003/0119625 A1* | 6/2003 | Bordini | ................ | F02D 41/408 |
| | | | | 903/910 |
| 2006/0194665 A1* | 8/2006 | Heitmann | .............. | B60K 6/387 |
| | | | | 475/5 |
| 2007/0161455 A1* | 7/2007 | King | ....................... | B60L 50/16 |
| | | | | 477/3 |
| 2011/0024208 A1* | 2/2011 | Wust | ........................ | B60K 6/48 |
| | | | | 180/65.21 |
| 2017/0232832 A1* | 8/2017 | Tseng | ..................... | B60K 6/387 |
| | | | | 475/5 |
| 2017/0341502 A1 | 11/2017 | Scholle et al. | | |
| 2021/0146768 A1* | 5/2021 | Wiener | ................. | B60K 6/547 |
| 2021/0309095 A1 | 10/2021 | Brudeli | | |

FOREIGN PATENT DOCUMENTS

| | | |
|---|---|---|
| DE | 4041117 | 7/1992 |
| DE | 4225315 | 2/1994 |
| DE | 202011107327 U1 | 3/2012 |
| DE | 102018118659 | 2/2020 |
| DE | 112019003813 T5 | 4/2021 |
| EP | 2256247 | 12/2010 |
| WO | WO 2023/104562 | 6/2023 |

OTHER PUBLICATIONS

English translation of DE4225315A1; http://translationportal.epo.org; Dec. 17, 2024 (Year: 2024).*

* cited by examiner

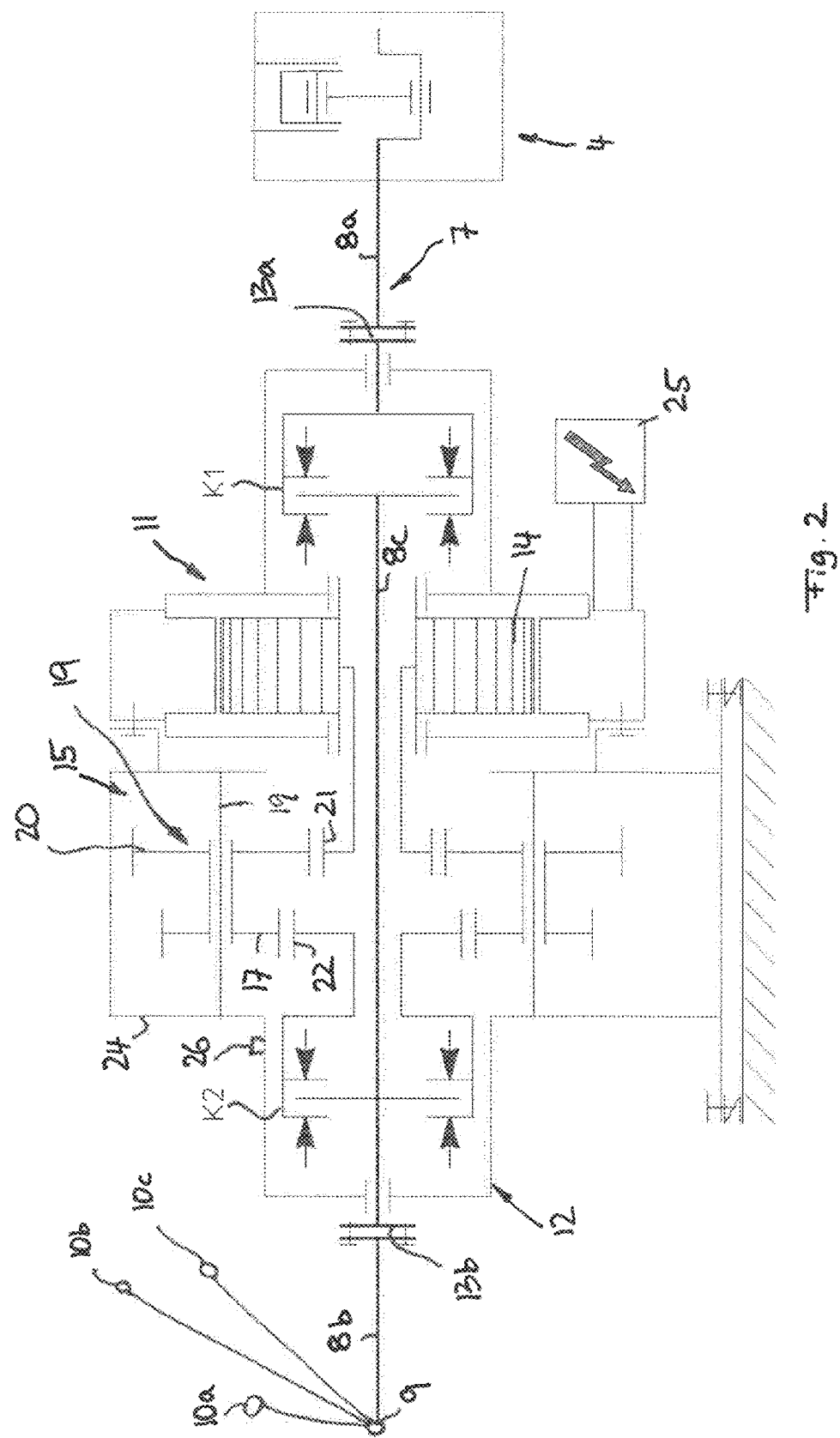

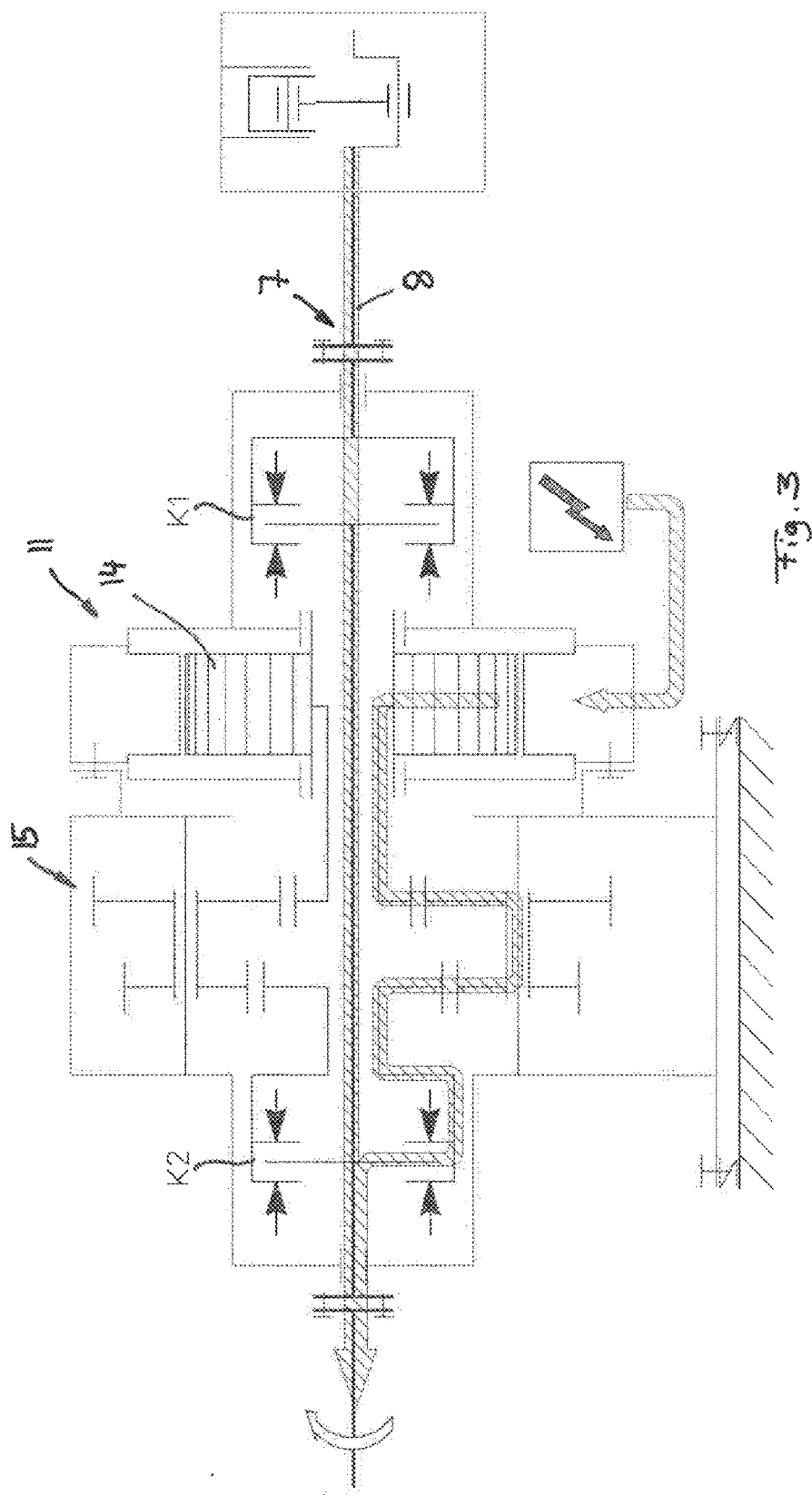

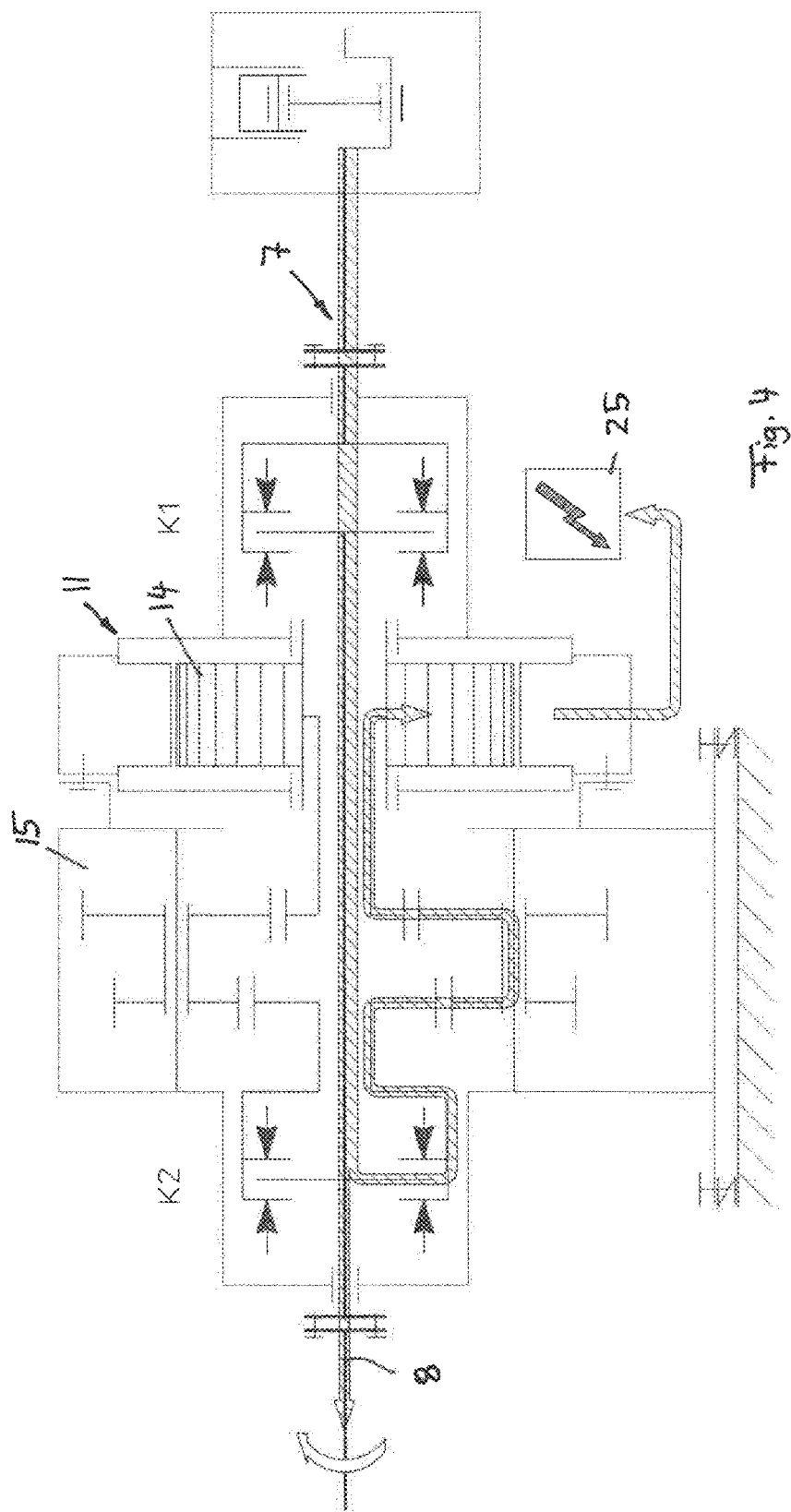

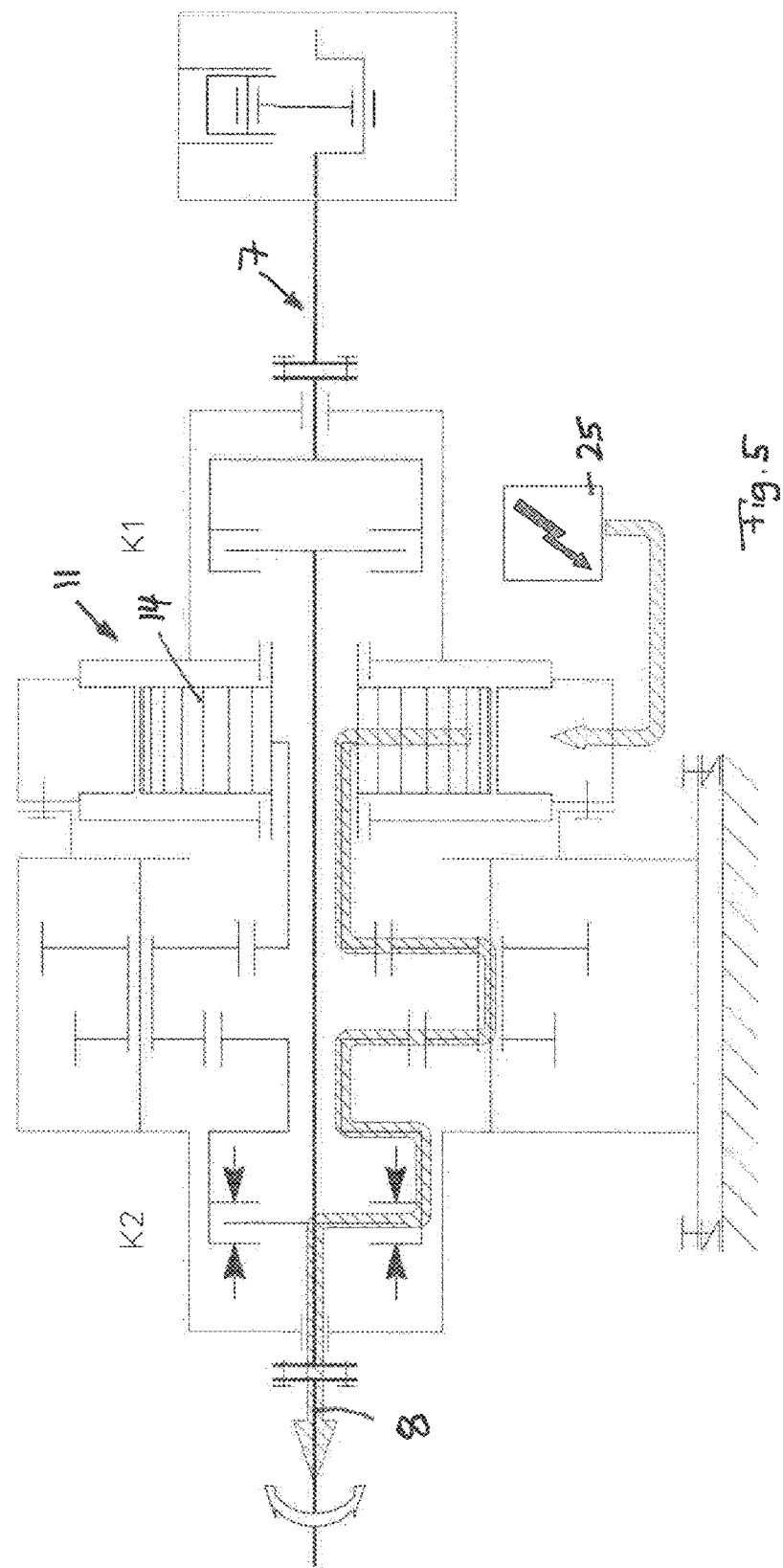

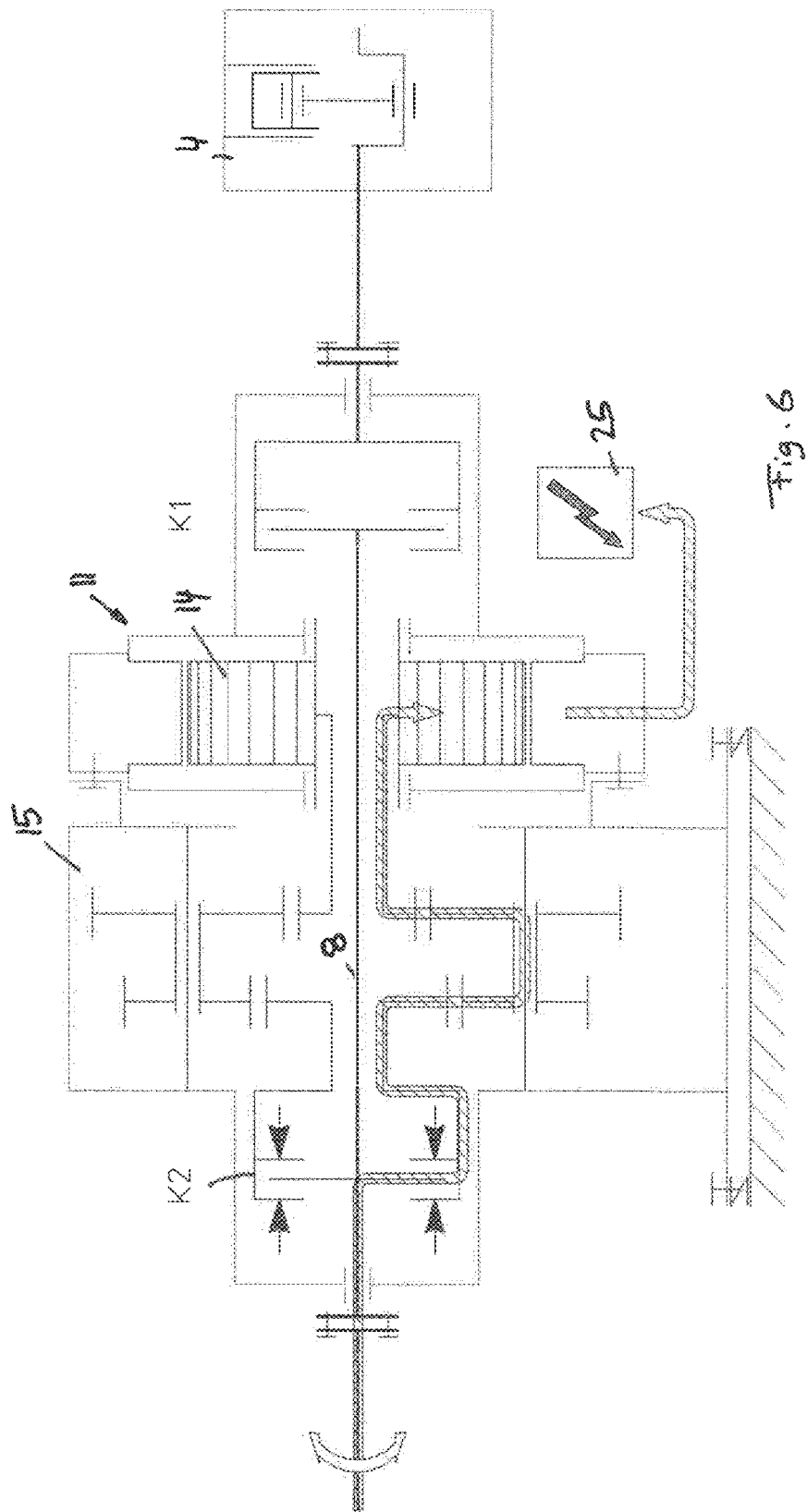

CONSTRUCTION- AND/OR MATERIAL-HANDLING MACHINE

CROSS-REFERENCE TO RELATED APPLICATIONS

This application is a continuation of International Patent Application Number PCT/EP2022/083407 filed Nov. 28, 2022, which claims priority to German Patent Application Numbers DE 10 2021 132 651.6 filed Dec. 10, 2021 and DE 10 2022 103 465.8 filed Feb. 15, 2022, which are incorporated herein by reference in their entireties.

BACKGROUND

The present invention relates to a construction- and/or material-handling machine such as a crane, excavator or tracked vehicle, comprising an internal combustion engine that drives one or more energy-consuming devices such as a pump, winch or hoisting or actuating mechanism via a mechanical drive train. The invention also relates to a retrofitted, pre-assembled drive assembly, which can be engaged if required, for installation in the mechanical drive train of such a construction- and/or material-handling machine.

Construction machinery such as cranes, tracked vehicles or excavators regularly have an internal combustion engine that drives consumers such as pumps, cable winches or hoisting or actuating mechanisms via a mechanical drive train, wherein the mechanical drive train can comprise a drive shaft extending from the internal combustion engine, for example in the form of a cardan shaft, which is connected to the respective consumer on the output side or is connected to several energy-consuming devices via one or more branching gearboxes and connecting drive shafts. Said energy-consuming devices can include hydrostatic drives whose pump is driven by the mechanical drive train in order to hydraulically actuate, for example, an actuating cylinder. In general, the energy-consuming devices that can be driven by the internal combustion engine via the mechanical drive train can generate working movements of the respective device, for example adjust structural parts of the construction- and/or material-handling machine such as jibs or tool arms or rotate a tower or generally a superstructure via a slewing gear, or raise and lower working tools such as a load hook or an excavator shovel, swivel them or actuate them in another way. In addition to the main working units, as consumers there can also be driven auxiliary units such as circulation pumps, cooling units and the like.

If the construction machine is configured to be mobile and self-propelled, for example in the form of a mobile crane such as a telescopic crane, or a tracked vehicle or an excavator, the mechanical drive train can also be part of a travel drive that can be connected to one or more driven chassis axles, for example via a switchable travel gear.

In order to be able to work locally emission-free on the construction site, the trend recently has been to replace internal combustion engines with central electric drives, wherein the central electric drive can be connected to a supply network via a grid connection, depending on the design of the construction- and/or material-handling machine, which is useful, for example, for stationary construction machines such as cranes. Alternatively or additionally, energy storage devices such as rechargeable batteries can also be used on board the construction machine, for example to avoid the inconvenience of a grid connection for mobile construction machines.

A tracked vehicle with an electric drive module is shown, for example, in the patent document DE 11 2019 003 813 T5.

It is the underlying object of the present invention to provide an improved construction- and/or material-handling machine of said type, which avoids disadvantages of the prior art and further develops the latter in an advantageous manner. In particular, the aim is to achieve efficient operation of the construction- and/or material-handling machine, which can be easily adapted to different work tasks and operating conditions without the need for special preparations to the working environment, such as grid connections.

SUMMARY

According to the invention, said task is solved by a construction- and/or material-handling machine and a retrofitted, pre-assembled electric drive assembly. Preferred embodiments of the invention are the subject-matter of the dependent claims.

It is therefore proposed to provide the construction- and/or material-handling machine with a hybrid drive, which on the one hand comprises the internal combustion engine and on the other hand has an activatable electric drive. According to the invention, an electric drive is provided which can be selectively engaged with and decoupled from the mechanical drive train by means of a clutch.

By switching on the electric drive, the mechanical drive train of the machine can be driven electrically, for example to provide additional torque in addition to the internal combustion engine within the meaning of a boost function. In this case, the mechanical drive train coming from the internal combustion engine and the connection thereof to various consumers of the construction- and/or material-handling machine can remain unchanged, as the electric drive is coupled to the mechanical drive train and uses its further branching or connection to the consumers. Simultaneously, by decoupling the electric drive, it is possible to continue working as before in the conventional manner using only the internal combustion engine if the electric drive is not required or pure combustion engine operation is more advantageous.

The drive torque generated by the electric drive for driving the mechanical drive train can preferably be controlled by an electronic control apparatus which can control the switching on of the drive torque or its level depending on the power requirement of the consumers driven by the mechanical drive train on the one hand and the drive power that can be provided by the internal combustion engine on the other hand, in particular in such a way that the electric motor drive torque is engaged and/or increased if the drive power of the internal combustion engine is no longer sufficient for the power required by the energy-consuming devices and/or cannot be started up quickly enough. Said control apparatus can also control the electric motor drive torque for driving the drive train independently of the drive power provided by the internal combustion engine, for example in order to drive the drive train locally emission-free in an emission-saving mode without any drive power from the internal combustion engine or with only limited drive power from the internal combustion engine.

In an advantageous further development of the invention, the electric drive, including said clutch, forms a retrofitted, in particular pre-assembled assembly which has shaft connectors arranged coaxially to one another at opposite end faces for coaxial installation of the assembly in the drive train coming from the internal combustion engine and for connecting a drive shaft of the mechanical drive train to two coaxial drive shaft pieces. In this way, the electric drive train including the clutch can form an assembly group that can be installed in a conventional mechanical drive train connected to the internal combustion engine without the drive train or also the connection of the energy-consuming devices to the drive train having to be modified or requiring a special architecture. For example, a piece on the central drive shaft connected to the internal combustion engine, such as a drive shaft section between two drive shafts, can be easily removed and replaced by the electric drive assembly, which is inserted coaxially into the mechanical drive train coaxially with the drive shaft pieces, which are themselves arranged coaxially with each other.

In particular, said assembly comprising the electric drive and the clutch can be provided to form an integral part of the mechanical drive train and transmit the drive torque coming from the internal combustion engine. When mounted, the electric drive assembly is in the power flow from the internal combustion engine, so that the torque generated by the internal combustion engine can be transmitted through the retrofitted assembly.

To supply the electric drive with electric power, an energy source is preferably provided, which may comprise a battery and/or a rechargeable battery and/or a grid connection, wherein said energy source may preferably form part of said retrofitted assembly comprising said electric drive. This means that the total electric drive assembly, including the energy source, can be easily retrofitted.

Advantageously, the electric drive can comprise a hollow shaft electric motor, through the hollow shaft of which a drive shaft of the mechanical drive train coupled to the internal combustion engine can extend. The electric motor sits coaxially above the mechanical drive train and allows the drive shaft coming from the internal combustion engine to pass through it, so that the stator of the electric motor extends around the drive shaft and the rotor rotates around the drive shaft, in particular with a rotor axis coaxial to it. Such a coaxial electric drive arrangement with a hollow shaft motor can achieve a compact design that also allows the electric drive to be retrofitted if the installation environment of the mechanical drive train itself has not been specially designed for additional drive assemblies.

In a further development of the invention, the electric motor can be connected to the mechanical drive train via at least one spur gear, wherein several spur gears or pairs of spur gears can also transmit the drive torque of the electric drive to the mechanical drive train.

Advantageously, the electric motor can be connected to the mechanical drive train, which comes from the internal combustion engine, via a planetary gear, wherein the planetary gear is preferably arranged between the electric motor and the clutch, via which the electric drive can be selectively engaged and disengaged. In particular, an output element of the planetary gear can be connected in a rotationally fixed manner to the clutch, which connects said output element of the planetary gear to the drive shaft of the mechanical drive train in a rotationally fixed manner or uncouples it depending on the closed state.

By arranging the clutch on the output side of the planetary gear, it is possible to prevent the planetary gear or also individual elements of the planetary gear from running idle when the electric drive is not required and is switched off.

The planetary gear can comprise one or more planetary gear stages.

Advantageously, the planetary gear is arranged overall coaxially to the drive shaft of the mechanical drive train, wherein advantageously a drive shaft piece, which transmits the torque coming from the internal combustion engine, can be passed through the planetary gear in order to be coupled on one side of the planetary gear to the internal combustion engine or a drive shaft piece connected thereto and on the other side of the planetary gear to the part of the mechanical drive train which leads to the energy-consuming devices. In particular, the drive shaft piece passing axially through the planetary gear can be connected to the clutch via which the electric drive can be engaged and decoupled, wherein said drive shaft piece can be connected to a coupling half of the clutch in a rotationally fixed manner.

Advantageously, the planetary gear can be configured to ensure that the planet carrier—or several planet carriers in case of several planetary gear stages—are stationary and also do not rotate during operation of the electric drive. Thanks to the planet carrier(s) configured so as not to circulate, there can be achieved various advantages. On the one hand, the rotatably mounted planets on the planet carrier do not experience any centrifugal forces, which generally allows higher speeds and has a positive effect on the meshing ratios of the meshing or rolling transmission spur gears. With a planet carrier configured so as not to circulate, the planets do not experience any centrifugal forces, also at high speeds. This makes it possible to dimension the bearings of the planetary gears less massively.

On the other hand, a planet carrier configured so as not to circulate eliminates the constant immersion in the oil sump that occurs with rotating planet carriers. This enables improved efficiency and correspondingly reduced heat generation, which also makes it possible to run at higher speeds without external cooling. Accordingly, the planetary gear can be configured to avoid external cooling; in particular, complex cooling measures such as a forced-circulation cooling circuit can be dispensed with.

The planetary gear can have a stationary, non-circulating ring gear, which can be fastened to the gear housing for rotation or configured to it on the inner circumference.

A stationary gear housing has the advantage—irrespective of the stationary arrangement of the ring gear, which could also be rotatably mounted in relation to the housing—that a pressure oil or fluid supply can be provided in a simple manner via the stationary housing, in particular in order to be able to actuate the clutch and/or a brake in the planetary gear by pressure medium. In particular, said clutch can be hydraulically actuated to connect and disconnect the electric drive to the mechanical drive train, which is facilitated by a pressurized oil supply via the stationary housing.

The planetary gear can comprise at least one sun gear, which can be hollow-forged or drilled or otherwise configured to be hollow, wherein a drive shaft piece connected to the internal combustion engine can extend through the hollow sun gear. In the case of a multi-stage design, the planetary gear can also comprise several sun gears, which can be configured to be hollow in order to allow the drive shaft piece, which is connected to the internal combustion engine, to pass through. By means of such hollow sun gears, the planetary gear can advantageously be arranged coaxially to the mechanical drive train, to which the electric drive is connected via the planetary gear.

The electric motor can advantageously be connected with its output shaft in a rotationally fixed manner to a sun gear of a first planetary gear stage. Alternatively or additionally, the clutch for coupling and decoupling the electric drive can be connected to the sun gear of a last planetary gear stage.

In order to be able to achieve high ratios or reduction ratios with an overall simple design, the planetary gear can comprise at least one double planet wheel stage, wherein the double planet wheels can comprise two planet wheels of different diameters and/or different numbers of teeth that are rotationally fixed to each other and jointly mounted on a planet carrier, each of which can mesh with a sun gear or be in rolling engagement therewith.

To increase the variability of the hybrid drive, a clutch can also be provided by which the internal combustion engine can be decoupled from or engaged with the mechanical drive train. Such a clutch for coupling and decoupling the internal combustion engine also allows the mechanical drive train to be operated solely from the electric drive or, conversely, to drive the electric motor alone in towing operation and operate it as a generator in order to efficiently charge the construction- and/or material-handling machine's batteries. However, if there is a high braking power requirement, the internal combustion engine can also be activated or remain activated in order to jointly brake the mechanical drive train using the tow resistors of the internal combustion engine and the electric motor.

Said clutch for coupling and decoupling the internal combustion engine can advantageously be integrated into the electric drive train assembly, so that when the electric drive train assembly is installed or retrofitted, simultaneous additional coupling and decoupling of the internal combustion engine to the mechanical drive train can also be achieved. The clutch for coupling and decoupling the internal combustion engine can be arranged on an axial side of the electric motor facing the internal combustion engine and/or on a side of the electric motor that is opposite to the planetary gear described above.

In an advantageous further development of the invention, between the shaft connectors, which are provided at opposite axial ends of the mounting assembly, there can be provided the clutch for coupling and decoupling the electric drive, its electric motor and the planetary gear or other transmission, if provided, as well as another clutch for coupling and decoupling the internal combustion engine.

Advantageously, the two clutches for coupling and decoupling the electric drive and for coupling and decoupling the internal combustion engine can be provided at opposite axial end portions of the pre-assembled mounting assembly, so that the electric motor and the transmission with the at least one spur gear can be provided axially between the two clutches.

BRIEF DESCRIPTION OF THE DRAWINGS

The invention is explained in more detail below using a preferred exemplary embodiment and associated drawings. The drawings show:

FIG. 3 a longitudinal sectional view of the drive train from FIG. 1, which shows the energy or torque flow from the electric motor to the mechanical drive train when the electric drive is engaged, so that the drive powers of the internal combustion engine and the electric drive are added together;

FIG. 4 a longitudinal sectional view of the drive train from the foregoing figures with the electric drive switched on, but operated as a generator in towing operation in order to charge an energy storage unit;

FIG. 5 a longitudinal sectional view of the drive train from the foregoing figures, wherein the internal combustion engine is uncoupled and the drive train is driven solely by the electric drive; and FIG. 6 a longitudinal sectional view of the drive train from the foregoing figures, wherein, similar to FIG. 4, the internal combustion engine is uncoupled, but the electric drive is in towing operation and the electric motor is operating as a generator to charge an energy storage unit.

DETAILED DESCRIPTION

Figure 1:
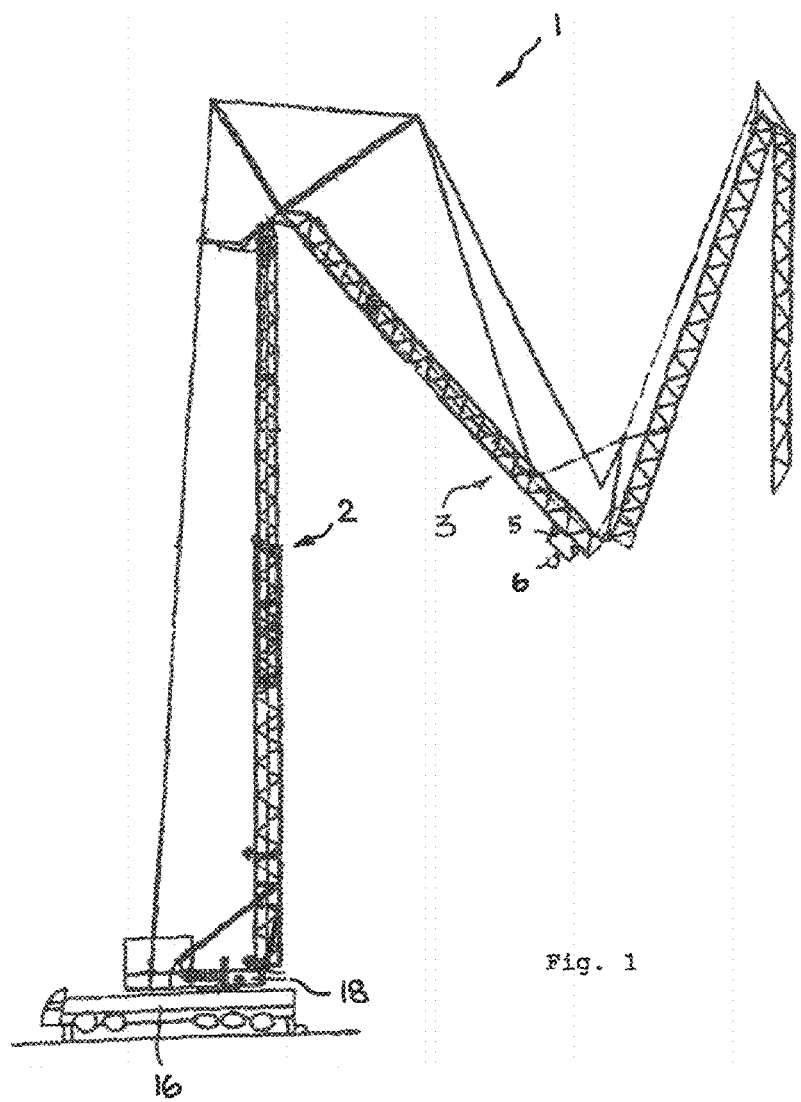
FIG. 1 a schematic side view of a construction- and/or material-handling machine in the form of a mobile rotating tower crane, FIG. 2 a longitudinal sectional view of the mechanical drive train of a construction- and/or material-handling machine from its internal combustion engine to its energy-consuming devices, wherein an engaged and decoupled electric drive is integrated into the drive train.

As shown in in FIG. 1, the construction- and/or material-handling machine can be configured to be a mobile rotating tower crane 1 comprising a jib 3 supported by an upright stationary tower 2. A trolley 5 can be moved along the jib 3 projecting from the tower 2, from which a load hook 6 runs via a hoist rope and can be raised and lowered.

The tower 2 is arranged on an upper carriage 18, which is mounted rotatably about an upright axis on a lower carriage 16 and can be rotated by a slewing gear. The undercarriage may comprise a traveling gear with at least one driven traveling gear axle in order to be able to move the crane 1 from site to site. As shown in FIG. 1, the crane can be foldable for this purpose in order to comply with road transport dimensions, wherein the tower 2 can be telescopic and the jib 3 can be foldable and/or telescopic, wherein the tower 2 can be luffed down onto the superstructure together with the folded jib 3.

For driving the various energy-consuming devices, the construction- and/or material-handling machine comprises an internal combustion engine 4, which drives a mechanical drive train 7 comprising a drive shaft 8, for example in the form of a cardan shaft, which is connected to the internal combustion engine 4, possibly via a transmission, and can be driven by the internal combustion engine 4.

The energy-consuming devices of the construction- and/or material-handling machine may be connected to the mechanical drive train via one or more transfer cases 9 and drive shafts branching off from them, for example in the form of pumps, winch drives or actuators for a structure, for example, the hoisting gear for raising and lowering the load hook 6, the slewing gear for rotating the tower 2 about the upright axis of rotation, possibly a luffing gear for luffing the jib 3 up and down or also a telescoping drive and/or folding drive for telescoping the tower 2 in and out and folding the jib 3 in and out. Furthermore, the drive train 7 can also form part of a travel drive and be coupled to at least one drivable axle of the traveling gear of the undercarriage 6, possibly via a shiftable travel gear, in order to be able to drive the mobile construction- and/or material-handling machine from one place of use to another.

As it is shown in FIGS. 2 to 6, an electric drive 11 is integrated into the mechanical drive train 7, which connects the internal combustion engine 4 with the energy-consuming devices 10*a, b, c*, and can be coupled to and decoupled from the mechanical drive train 7 by means of a clutch K2, so that the electric drive 11 can be engaged and disengaged.

The electric drive 11, including at least the clutch K2, forms a pre-assembled assembly for retrofitting to an existing construction- and/or material-handling machine, wherein the electric drive assembly 12 can advantageously also comprise a further clutch K1, by means of which the internal combustion engine 4 can be decoupled from or coupled to the drive train 7.

Said retrofitted assembly 12 can be integrated coaxially into the mechanical drive train and advantageously comprise shaft connectors 13a and 13b at opposite axial ends, which can be arranged coaxially to each other and can be connected coaxially to the drive shaft 8. More specifically, the two shaft connectors 13a and 13b can be coupled in rotation to a drive shaft piece 8a coupled to the internal combustion engine 4 and, on the other hand, to a drive shaft piece 8b leading to the energy-consuming devices 10a, b, c, and can be coaxially aligned with said drive shaft pieces 8a, 8b. For example, the shaft connectors 13 can comprise screwable shaft flanges or shaft hub connections that connect the assembly 12 to the drive shaft 8 in a rotationally fixed manner.

The retrofitted assembly 12 can comprise a drive shaft piece 8c, which can extend coaxially to the drive shaft pieces 8a and 8b and can extend axially through the electric drive in order to be able to feed the drive power of the internal combustion engine 4 through the engaged electric drive 11 and input it to the energy-consuming devices.

The electric drive 11 can comprise an electric motor 14, which can be configured to be a hollow shaft motor in order to be able to guide the drive shaft 8 connected to the internal combustion engine 4 therethrough.

The electric motor 14 can transmit its drive power to the drive shaft 8 via at least one spur gear 17, wherein the spur gear 17 can be coupled to and uncoupled from the drive shaft 8 of the drive train 7 via said clutch K2.

In particular, the electric motor 14 of the electric drive 11 can be connected to the drive shaft 8 via a planetary gear 15, wherein said planetary gear 15 can advantageously extend between the electric motor 14 and the clutch K2. An output-side planetary gear element can be connected in a rotationally fixed manner to one coupling half of the clutch K2, the other coupling half of which can be connected in a rotationally fixed manner to the drive shaft 8, so that depending on the closed state of the clutch K2, the planetary gear 15 is uncoupled from or coupled to the drive shaft 8 of the drive train 7.

As shown in FIGS. 2 to 6, the planetary gear 15 can advantageously comprise a planet carrier 19, being stationary, configured as not to circulate, on which at least one set of planet wheels 20 can be rotatably mounted in order to be in rolling engagement with one or more sun gears 21, 22 and possibly one or more ring gears.

As the figures show, the planet wheels 12 can be configured to be double planets, wherein two planet wheels can be rotatably connected to each other and jointly rotatably mounted on the planet carrier 19, wherein the two planet wheels can comprise different diameters or numbers of teeth and can be in rolling engagement with sun gears 21, 22 of different sizes.

The sun gears 21, 22 are advantageously configured to be hollow and arranged coaxially to the drive shaft 8 of the mechanical drive train 7, so that said drive shaft 8 can be guided axially through the sun gears 21, 22, cf. FIG. 2.

One of the sun gears 21 can form the input-side drive element of the planetary gear 15, while the other sun gear 22 can form the output element of the planetary gear 15, which can be connected in a rotationally fixed manner to the clutch K2.

In particular, the electric motor 14 of the electric drive 11 can be connected to said sun gear 22 on the input side, which drives the planet wheels 17, which in turn drive the second sun gear 22. When the clutch K2 is closed, the drive power is then applied from the sun gear 22 to the drive shaft 8.

As shown in FIG. 2, the two clutches K1 and K2 may be provided at opposite axial end portions of the retrofitted assembly 12 and/or axially enclose between them the electric motor 14 and the planetary gear 15, wherein both clutches K1 and K2 may be part of the pre-assembled assembly 12 and/or may be received within a jointly assembly housing.

As shown in FIG. 2, the electric motor 14 can be supplied with electric power from an energy source 25, for example a battery or a rechargeable battery or possibly also a supply network.

As shown in FIG. 3, when the clutches K1 and K2 are closed, the drive powers of the internal combustion engine 4 and the electric drive 11 can be added together to jointly drive the drive shaft piece 8b on the output side from the internal combustion engine 4 and the electric drive 11. The drive power or torque of the internal combustion engine 4 flows axially and centrally through the connected electric motor 14 and is transmitted via the axially extending drive shaft 8. The drive torque of the electric drive 11 is connected to the drive shaft 8 via the coaxial planetary gear 15 and the clutch K2.

As shown in FIG. 4, with closed clutches K1 and K2, the electric drive 11 can also be operated in towing operation, in which the electric motor 14 works as a generator and can store energy generated in the energy storage 25.

In another operating mode, however, the internal combustion engine 4 can also be decoupled from the drive train 7 by opening the clutch K1, so that the electric drive 11 can work alone or drive the mechanical drive train 7 alone when the clutch K2 is closed simultaneously. This can be used to reverse the drive train 8 in a simple manner or to drive it in opposite directions, as the electric motor 14 can be reversed in its direction of rotation in a simple manner.

However, with said operating mode of the clutches, i.e. open clutch K1 and closed clutch K2, the electric drive 11 can also be operated in towing mode in order to brake the drive train 7. The electric motor 14, which then works as a generator, can store the energy it provides in the energy storage unit 25.

The clutches K1 and K2 can be configured to be hydraulically actuated, wherein a pressure oil supply 26 can be provided in a simple manner via the stationary gear housing 24.

By providing the two clutches K1 and K2 or the activatable electric drive 11, the operating state can be adapted in various ways to a wide range of operating conditions. The following table illustrates the switching options:

| V | E | K1 | K2 | n | T | P | Description |
|---|---|----|----|---|---|---|-------------|
| on | off | x | o | $n_V$ | $T_V$ | $P_V$ | only combustion engine rotates |
| on | on | x | x | $n_V$ | $T_V+$ $T_E$ | $P_V+$ $P_E$ | combustion engine and electric motor add the torques |
| a | a | x | x | $n_E$ | $T_V-$ $T_E$ | $P_V-$ $P_E$ | electric motor runs as a generator, is driven → charging function |
| off | on | o | x | $n_E$ | $T_E$ | $P_E$ | only e-motor drives, drive forward |
| off | on | o | x | $-n_E$ | $-T_E$ | $P_E$ | only e-motor drives, drive backwards |
| off | on | o | x | $n_E$ | $-T_E$ | $-P_E$ | only electric motor is driven from outside, braking operation, drive forwards |
| off | on | o | x | $-n_E$ | $T_E$ | $-P_E$ | only electric motor is driven from the outside, braking operation, driving backwards |

The abbreviations used in the table above indicate the following:

V = internal combustion engine (4)
E = electric motor (14)
K1 = clutch 1
K2 = clutch 2
− = negative
n = speed
T = torque
P = power
$T_V$ = torque internal combustion engine
$T_E$ = torque electric motor
$P_V$ = power internal combustion engine
$P_E$ = power electric motor
x = clutch closed
o = clutch open The electric drive 11 integrated into the mechanical drive train 7, which is integrated into the power path of said drive train 7, may also have advantageous uses beyond construction- and/or material-handling machines and may form an aspect of the present invention independently and autonomously of a construction- and/or material-handling machine, in particular in the form of a retrofitted, pre-assembled assembly for installation in a mechanical drive train.

We claim:

1. A construction machine comprising:
an internal combustion engine configured to drive one or more energy-consuming devices of the machine via a mechanical drive train, wherein the one or more energy consuming devices comprise a pump, winch, actuator for a structure and/or working unit drives,
an electric drive for driving the mechanical drive train which is engaged by a clutch and decouplable from the mechanical drive train, and
a planetary gear that connects the electric drive to the mechanical drive train, wherein the planetary gear comprises a stationary, non-rotating planet carrier, on which at least one set of planet wheels is rotatably mounted, wherein the planetary gear comprises double planet wheels connected to one another in a rotationally fixed manner and jointly rotatably mounted on the planet carrier, comprise different diameters and/or numbers of teeth and are in rolling engagement with two separate sun gears.

2. The machine of claim 1, wherein the electric drive including the clutch forms a retrofitted, pre-assembled assembly comprising shaft connectors arranged coaxially to one another at opposite end faces for coaxial installation in the mechanical drive train and for connecting to two coaxial drive shaft pieces of a drive shaft of the mechanical drive train.

3. The machine of claim 1, wherein a power flow of the internal combustion engine is passed centrally through the electric drive via the mechanical drive train.

4. The machine of claim 2, wherein the retrofitted, pre-assembled assembly forms an integral part of the mechanical drive train and is configured to transmit a torque of the internal combustion engine, wherein the retrofitted, pre-assembled assembly comprises a drive shaft piece for coupling the shaft connectors to one another in a rotationally fixed manner and to which the electric drive can be coupled by the clutch, wherein the drive shaft piece comprises two portions.

5. The machine of claim 1, wherein the electric drive comprises an electric motor and at least one spur gear for transmitting drive power of the electric motor to the mechanical drive train.

6. The machine of claim 2, wherein the electric drive comprises a hollow shaft motor, through the hollow shaft of which the drive shaft of the mechanical drive train coupled to the internal combustion engine extends, wherein the hollow shaft can be rotated relative to the drive shaft and can be coupled in a torque-transmitting manner via at least one spur gear and the clutch.

7. The machine of claim 1, wherein an output element of the planetary gear is connected in a rotationally fixed manner to a coupling half of the clutch for coupling and uncoupling the electric drive to/from the mechanical drive train and wherein an input element of the planetary gear is connected in a rotationally fixed manner to the electric motor of the electric drive.

8. The machine of claim 7, wherein the output and input elements of the planetary gear are formed by sun gears of the planetary gear, arranged coaxially to a drive shaft of the mechanical drive train.

9. The machine of claim 1, wherein the planetary gear comprises at least one sun gear which is configured to be hollow and through which a drive shaft of the mechanical drive train for transmitting drive power of the internal combustion engine extends axially.

10. The machine of claim 1, wherein the planetary gear is arranged coaxially to the mechanical drive train, which passes axially through the planetary gear.

11. The machine of claim 1, wherein the clutch is configured to couple and decouple the internal combustion engine to the mechanical drive train.

12. The machine of claim 11, wherein the clutch comprises a first clutch and a second clutch, wherein the first clutch is configured to couple and decouple the internal combustion engine and is integrated into the retrofitted, pre-assembled assembly, which comprises the electric drive and the second clutch for coupling and decoupling the electric drive to/from the mechanical drive train.

13. The machine of claim 1, wherein a motor housing of the electric drive and/or a gear housing connected thereto is configured to be stationary and not to circulate, and comprises a pressure medium connection for supplying pressure medium for actuating the clutch.

14. The machine of claim 5, wherein an electronic control apparatus controls the electric drive with regard to a drive torque generated by the electric drive and applied to the mechanical drive train in dependence on an operating state of the internal combustion engine and drive power required by the one or more energy-consuming devices, wherein the electronic control apparatus is configured to apply additional drive torque from the electric motor to the mechanical drive train if the drive torque of the internal combustion engine is not sufficient.

15. The machine of claim 5, wherein an energy source supplies the electric motor with electric power, the energy source comprising a battery and/or a rechargeable battery and/or a supply mains connection, wherein the energy source forms part of the retrofitted, pre-assembled assembly comprising the electric drive.

16. A retrofitted, pre-assembled electric drive assembly for installation in a mechanical drive train of a construction machine, comprising:
a drive shaft piece comprising two portions,
two mutually coaxial shaft connectors arranged at opposite axial ends of the assembly for rotationally fixed connection of the drive shaft piece to two drive shaft pieces of the mechanical drive train,
an electric motor, wherein the electric motor comprises a hollow shaft through which the drive shaft piece passes, and wherein a planetary gear comprises, as input and output elements for rotationally fixed connection to the hollow shaft of the electric motor and a coupling half of the at least one clutch, two sun gears configured to be hollow and through which the drive shaft piece extends, at least one clutch for coupling and decoupling the electric motor to the drive shaft piece, and at least one spur gear between the electric motor and the at least one clutch and/or between the at least one clutch and the drive shaft piece.

17. The assembly of claim 16, wherein a clutch is positioned between the drive shaft piece and one of the shaft connectors for releasing and closing the rotationally fixed connection between the shaft connector and the drive shaft piece.

18. A retrofitted, pre-assembled electric drive assembly for installation in a mechanical drive train of a construction machine, comprising:

a drive shaft piece comprising two portions, two mutually coaxial shaft connectors arranged at opposite axial ends of the assembly for rotationally fixed connection of the drive shaft piece to two drive shaft pieces of the mechanical drive train, an electric motor, at least one clutch for coupling and decoupling the electric motor to the drive shaft piece, wherein a clutch is positioned between the drive shaft piece and one of the shaft connectors for releasing and closing the rotationally fixed connection between the shaft connector and the drive shaft piece, and at least one spur gear between the electric motor and the at least one clutch and/or between the at least one clutch and the drive shaft piece.

* * * * *